United States Patent [19]

Matsui et al.

[11] 4,276,161

[45] Jun. 30, 1981

[54] FUEL FILTER PROVIDED WITH A WATER LEVEL DETECTING MEANS

[75] Inventors: Katsuhiko Matsui, Yokohama; Yukio Kashiwaba, Omiya; Yoshioki Kishimoto, Tokyo, all of Japan

[73] Assignee: Nissan Motor Company, Limited, Yokohama, Japan

[21] Appl. No.: 110,348

[22] Filed: Jan. 7, 1980

[30] Foreign Application Priority Data

Jan. 10, 1979 [JP] Japan .................................. 54-1747[U]

[51] Int. Cl.³ .......................................... B01D 27/10
[52] U.S. Cl. ...................................... 210/86; 210/138
[58] Field of Search .................. 210/86, 97, 104, 114, 210/115, 93, 138

[56] References Cited

U.S. PATENT DOCUMENTS

| | | | |
|---|---|---|---|
| 3,088,592 | 5/1963 | Clark | 210/114 |
| 3,317,042 | 5/1967 | Botstiber | 210/86 |
| 3,568,835 | 3/1971 | Hansen | 210/86 |

*Primary Examiner*—John Adee
*Attorney, Agent, or Firm*—Lowe, King, Price & Becker

[57] ABSTRACT

A fuel filter is provided with a water level detector having an electrode (23) provided at a bottom part of a casing (3) of the fuel filter forming a detecting gap with the metal body of the casing (3). Should the water level in the casing of the fuel filter reach a predetermined level, a low resistance condition between the electrode and casing is detected by a water level detecting circuit (26).

7 Claims, 7 Drawing Figures

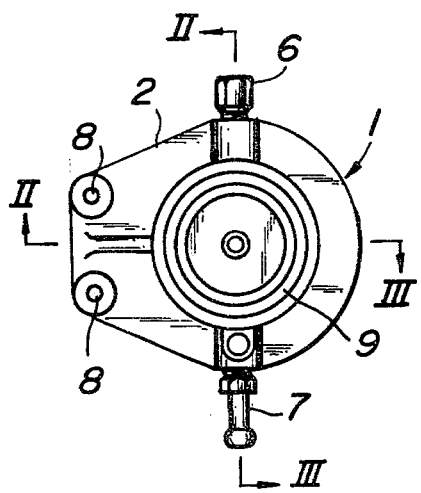
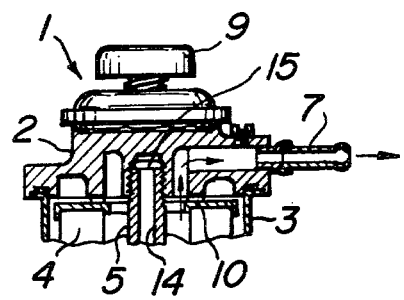
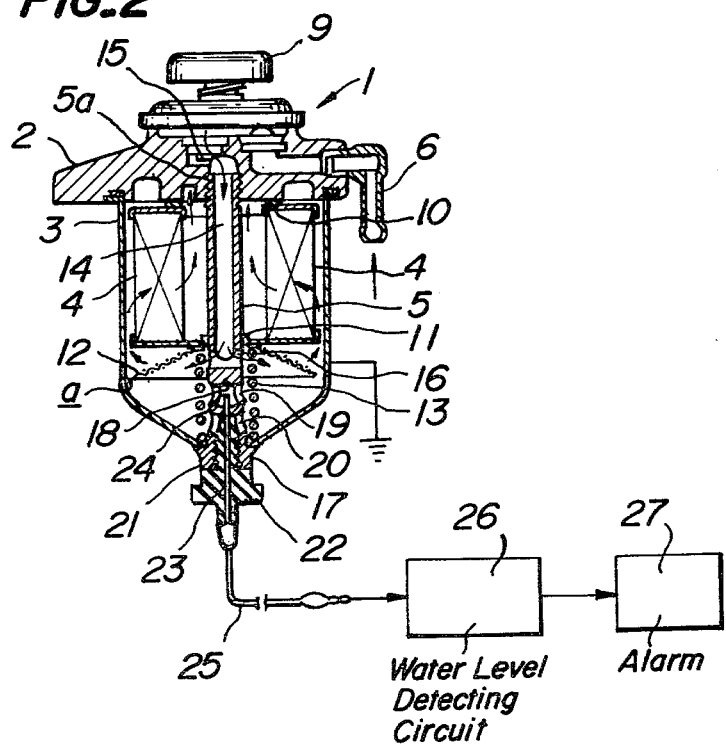

FUEL FILTER PROVIDED WITH A WATER LEVEL DETECTING MEANS

BACKGROUND OF THE INVENTION

The present invention relates to a fuel filter or a fuel filtering device used in a vehicle engine or the like which also functions as a water remover or a water fuel separator.

In a conventional fuel filter used, for example, in a Diesel engine, a casing made of glass or steel is mounted underneath a bracket having a fuel inlet and a fuel outlet and a filter element is accommodated in said casing. The fuel introduced from the fuel inlet flows down a central passageway and enters the casing through a lower opening. The fuel changes in flow direction to ascend in the casing and be filtered by the filter element and sent to the engine through the fuel outlet.

In such a conventional fuel filter, a major part of the water content included in the fuel or introduced from moisture in the air may fall by gravity when the fuel flows from the opening. When the fuel is reversed in direction to flow upwardly, the remainder of the water content may attach to the surface of the filter element and accumulate to form droplets, which fall and gather in the bottom of the casing. A very small amount of water may pass through the filter element but such a small amount of water is very easily fully burned in the engine and does not affect engine efficiency. The water gathering in the bottom part of the casing may be removed at a suitable maintenance interval.

A drawback has been found in such a conventional fuel filter. Since a large amount of water may attach to the surface of the filter element and accumulate thereon when the filter is in use, the surface of the filter element applied with water gathering treatment or water repellent treatment is gradually attacked by the water over a period of time so that the life of the filter element is shortened. Furthermore as a recent requirement especially related to the exhaust gas purification, it is necessary to remove the water in the fuel to substantially zero in order to accurately maintain the measuring of the fuel amount at the fuel injection valve. From this requirement it is necessary to separate the water content in the fuel as completely as possible before reaching the filter element.

The water content accumulated in the bottom part of the casing of the fuel filter is manually removed at certain regular intervals. However, if the water removing process is forgotten, the water level may reach the lower surface of the filter element. If such a situation occurs, not only does the filtering efficiency deteriorate but a large amount of water may be sent to the engine together with the fuel. This has an especially detrimental effect if the filter element is old and the filtering function has deteriorated. This is a major cause of spoiling the engine characteristics. Furthermore, rust may be induced in the injection valve which may disturb accurate measuring of the fuel.

One object of the present invention, therefore, is to provide a fuel filter which avoids the aforementioned dangerous situation.

SUMMARY OF THE INVENTION

A fuel filter, according to the present invention, comprises an electrode for water level detection in the bottom portion of the filter casing and projecting at a certain predetermined level. By using an electric signal developed by the electrode, the water level is always monitored when the engine is in use and an alarm condition is indicated when the water level reaches a predetermined height or level. The fuel filter according to the present invention is thus quite useful for vehicle engines.

BRIEF DESCRIPTION OF THE DRAWINGS

FIG. 1 is a plan view of a first embodiment of the present invention;

FIG. 2 is a vertical cross-sectional view taken along the line II—II in FIG. 1;

FIG. 3 is a vertical cross-sectional and partial view taken along the line III—III in FIG. 1;

DESCRIPTION OF THE PREFERRED EMBODIMENTS

Figure 4:
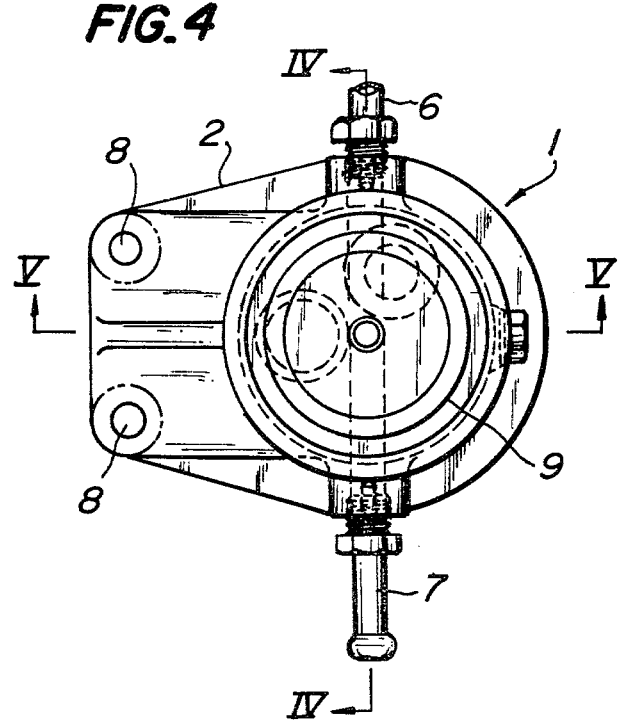
FIG. 4 is a plan view of a second embodiment of the present invention.

FIGS. 1 to 3 show a first embodiment of the present invention. In these figures, reference numeral 1 designates generally a fuel filter comprising a bracket 2, a metal casing 3 mounted at the bottom of the bracket 2, and a filter element 4 accommodated in the metal casing 3. The filter element 4 is known per se and has a cylindrical shaped filtering paper provided with folds. The surface of the filtering paper is treated to separate the water in the fuel.

The filter element 4 is mounted and fixed concentrically with the bracket 2 by a hollow column 5 having a threaded portion 5a at one end, which is screwed into a threaded bore in the bracket 2.

The bracket 2 is provided with a fuel inlet 6 and a fuel outlet 7, and with two mounting holes 8 to mount it on the engine block. Above the bracket 2 is provided a manually operated primer pump 9 known per se, which is to supply the fuel to the fuel injection pump prior to starting of an engine. Reference numeral 10 designates a packing seal between the filter element 4 and the bracket 2, and 11 is a packing seal between the filter 4 and the hollow column 5. A frusto-conically shaped wire gauze filter 12 is provided below the cylindrical filter element 4 and is held concentrically therewith by a spring 13. The outer diameter of the gauze filter 12 is made somewhat smaller than the inner diameter of the casing 3 so as to form a clearance a between the inner wall of the casing 3.

The hollow column 5 has an inner passage 14 therein and has at its top an upper opening 15 communicating with the fuel inlet 6 and at its bottom a first opening 16 crossing normally the inner passage 14 and communicating therewith. The vertical position of the first opening 16 is located below the wire gauze filter 12 as shown in the drawing. An inner passage 18 is formed in the hollow column 5 above the head 17. Further a second opening 19 and a third opening 20 are successively provided to intersect normally the passage 18 and communicate therewith. The column 5 is sealed against the casing 3 by a packing 21 and secured in its position.

A connector 22 of an insulating material provided with a rod shaped metal electrode 23 for water level detection is mounted detachably on a bottom member 17 of the hollow column 5. The metal electrode 23 has an exposed portion 24 at its top, which is located about the center of the second opening 19. A lead wire 25 is provided for connecting the electrode 23 to a water level detecting circuit 26 which will be explained in detail hereinafter. An alarm device 27 such as an alarm lamp, alarm buzzer, etc., controlled by an output of the water level detecting circuit 26 is provided as shown in the drawing.

Operation of the fuel filter device 1 substantially as shown in the drawing and as described in the foregoing will now be explained. The fuel introduced through the fuel inlet 6 flows down the passage 14 of the hollow column 5 and flows out through the first opening 16 and gradually fills up the casing 3 from the bottom. The fuel passes upwardly through the frusto-conical filter 12 and then passes through the cylindrical filter element 4 from its outer surface to its inside. When the fuel flow turns upwardly and ascends along the wall of the cylindrical filter element 4, a substantial portion of the water content included in the fuel drops off under gravity. Thus separated water passes downwardly through the filter 12 and is accumulated at the bottom of the casing 3. A small amount of water contained in the fuel may tend to pass through the cylindrical filter element 4 with the fuel. Such a water content, however, generally attaches on the outer surface of the filter element 4 and after accumulation to form a droplet, falls down and passes through the small gap a formed between the filter 12 and the inner wall of the casing 3 when the engine is stopped. The fuel, which has been filtered to remove water content, is sent to the engine (not shown) through the fuel outlet 7.

The level of the water accumulated at the bottom of the casing 3 increases gradually. When it reaches the level of the top portion 24 of the electrode 23, the electric resistance between the electrode 23 for the water level detection and the casing 3, which had been electrically insulated by the fuel, suddenly decreases by the conductance of the water. This resistance variation is detected by the water level detecting circuit 26 and the output signal of the alarm device 27 is operated to indicate the necessity of automatically removing water by, for instance, turning on a lamp or by a buzzer tone.

When such an alarm condition is indicated, the connector 22 may be removed manually and the accumulated water through the opening 18 may be removed through the third opening 20.

Figure 5:
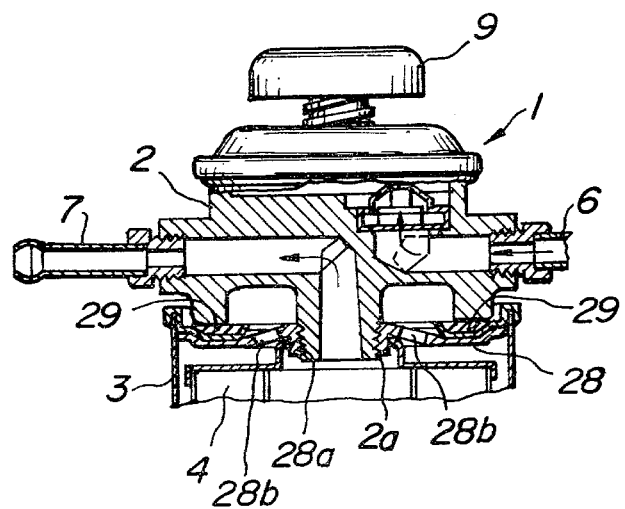
FIG. 5 is a vertical cross-sectional and partial view taken along the line IV—IV in FIG. 4.
Figure 6:
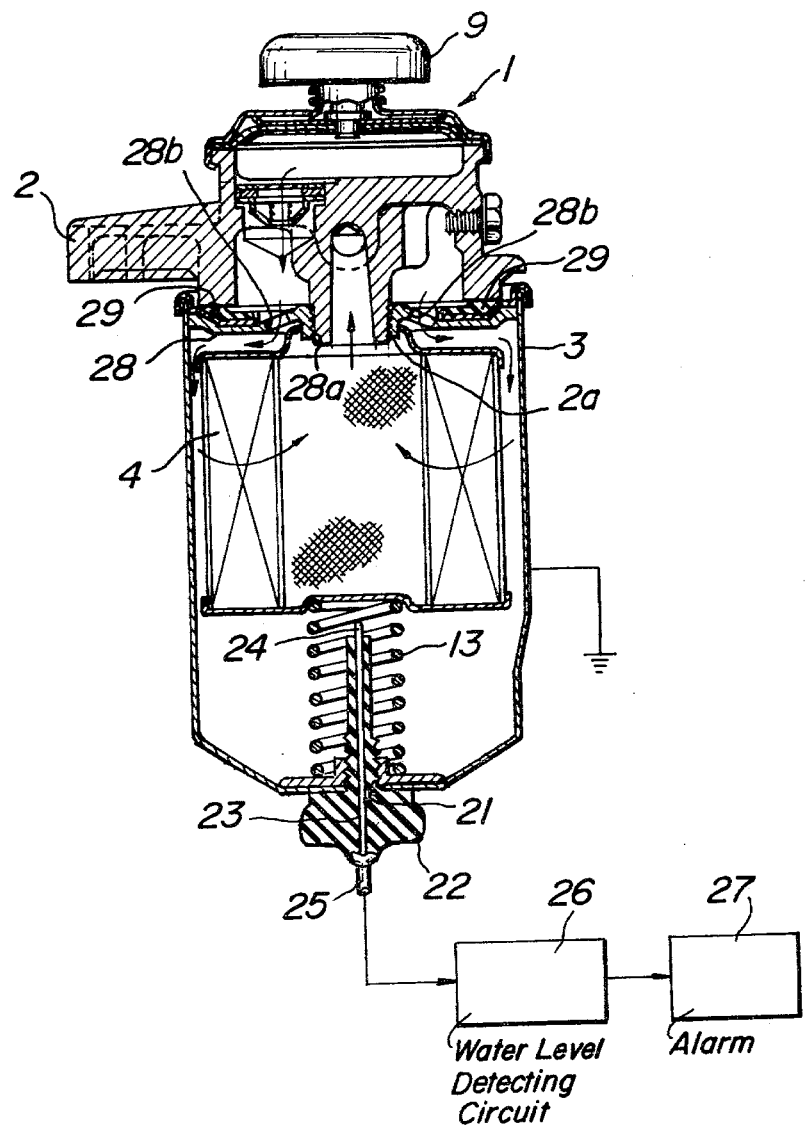
FIG. 6 is a vertical cross-sectional view taken along the line V—V in FIG. 4.

FIGS. 4 to 6 show a second embodiment of the present invention.

In this second embodiment, the hollow column 5 and the filter 12 in the former embodiment are removed and the fuel flow route is altered. The remaining portions are substantially same in the construction and operation. The same portions are indicated by the same reference numerals.

In this second embodiment, a flange 28 is provided on the casing 3. The flange 28 comprises a thread 28a engaging with an outer thread provided on the outer periphery of a central boss of the bracket 2. The flange 28 further comprises a number of through holes 28b surrounding said thread 28a for passing the fuel. The flange 28 and the casing 3 are joined together by calking or the like and accommodate a filter element 4 which is biassed upwardly by a spring 13. The flange 28, the casing 3 and the filter element 4 housed therein form a unitary cartridge, which may be detached as a whole from the bracket 2. When mounting this cartridge on the bracket 2, the thread 28a of the flange 28 may be screwed on the thread 2a provided in the central boss of the bracket 2. Reference numeral 29 designates a packing for a seal. When the filter element 4 becomes old, the whole cartridge may be replaced so that handling is very easy.

Figure 7:
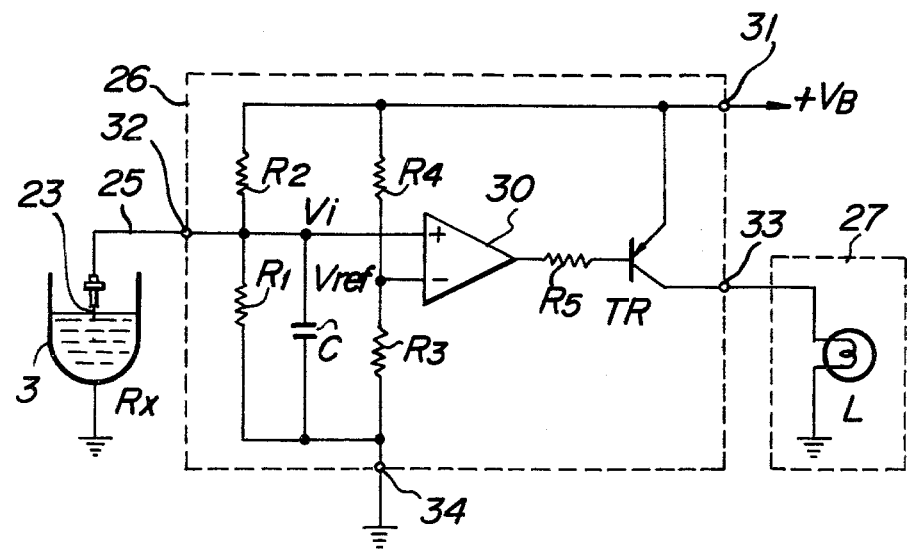
FIG. 7 is a circuit diagram showing one embodiment of the water level detecting circuit and the alarm device.

One embodiment of the water level detecting circuit 26 and the alarm 27 is shown in FIG. 7.

The water level detecting circuit 26 comprises a comparator 30, shunt resistors $R_1$ and $R_2$ for supplying voltage Vi to a non-reversal input terminal of the comparator 30 and shunt resistors $R_3$ and $R_4$ for supplying a reference voltage Vref to a reversal input terminal of the same. The water level detecting circuit 26 further comprises a switching transistor TR controlled by an output of the comparator 30 through a resistor $R_5$ connected between the output terminal of the comparator 30 and base of the transistor TR. A source terminal 31 of the circuit 26 is connected to a voltage source, such as a battery; an input terminal 32 is connected with the lead wire 25 originating from the previously explained water level detecting electrode 23, and an output terminal 33 thereof is connected to an alarm device 27 such as an alarm lamp L provided on an instrument panel or the like. An earth terminal 34 is connected to ground. The metal casing 3 and the other terminal of the alarm lamp L are also grounded.

If we assume the source voltage as $+V_B$, the reference voltage Vref may be represented by the following:

$$Vref = V_B \cdot \frac{R_3}{R_3 + R_4}$$

On the other hand, we may assume the resistance between the water level detecting electrode 23 and the casing 3 as Rx. When the fuel, such as a light oil, is present between the electrode 23 and the casing 3, since the oil is a dielectric, the resistance Rx is nearly infinite. Thus:

$$Rx = \infty$$

The voltage Vi appearing at the non-inverting input of the comparator 30 then becomes as follows:

$$Vi = V_B \cdot \frac{R_1}{R_1 + R_2}$$

If we select the values of the resistors $R_1$ to $R_4$ to assume Vi>Vref, namely;

$$V_B \cdot \frac{R_1}{R_1 + R_2} > V_B \cdot \frac{R_3}{R_3 + R_4} \qquad (1)$$

the output of the comparator 30 becomes high. By this, the transistor TR turns OFF so that no current flows through the collector and the alarm light will not be turned on.

If water exists between the water level detecting electrode 23 and the casing 3, the resistance Rx therebetween suddenly decreases by the conductance of the water. The voltage Vi' being applied to the non-reversal input terminal of the comparator becomes as follows:

$$Vi' = \frac{V_B}{R_2 + \frac{R_1 R_x}{R_1 + R_x}} \times \frac{R_1 R_x}{R_1 + R_x} = V_B \cdot \frac{R_1}{R_1 + \frac{R_2(R_1 + R_x)}{R_x}}$$

This voltage Vi' is lower than the voltage Vi.

(Vi' < Vi)

Therefore we may select the resistances of the resistors $R_1$ to $R_4$ and Rx in order to satisfy the following condition.

Vi' < Vref

This means that:

$$V_B \cdot \frac{R_1}{R_1 + \frac{R_2(R_1 + R_x)}{R_x}} < V_B \cdot \frac{R_3}{R_3 + R_4} \quad (2)$$

The output of the comparator 30 thus becomes low and the transistor TR turns ON. The collector current of the transistor TR causes the alarm lamp L to become energized and an alarm condition indicates that the water level has reached a predetermined level.

It is required to select the resistance values of the resistors $R_1$ to $R_4$ and Rx to satisfy the above equations (1) and (2). However, the resistance Rx cannot be selected at will, so an auxiliary resistance may be inserted in series when required.

A capacitor C is provided across the resistor $R_1$. This capacitor C has the following purposes. When a source voltage switch is turned on, the voltage Vi assumes a low value until the capacitor C is charged up, so that the alarm lamp L is energized for a short time and a proper operation of the circuit can be confirmed. Further, as a result of vibration of vehicle or the like, when the water temporarily exists between the water level detecting electrode 23 and the casing 3 or only the fuel exists therebetween during the turning on condition of the alarm lamp, the capacitor C prevents irregular turning on or off of the alarm lamp L.

In the foregoing embodiment, a comparator is used in the water level detecting circuit 26. However, this is not limited to such a circuit. A bridge circuit formed by resistors, a flip flop circuit, a Schmidt circuit or the like, for example, may be used therefor. In general, this circuit should be one able to detect a sudden variation of an electric value, such as the resistance value or the variation of the voltage or current caused thereby to operate the alarm device such as an alarm lamp, a buzzer, etc. It is also possible to operate the alarm device indirectly by a relay, rather than directly by the transistor.

Furthermore, in the foregoing embodiment, the casing 3 is made of metal so as to act also as a counter electrode of the water level detecting electrode 23. However, the hollow column 5 or the spring 13 of the first embodiment and the spring 13 in the second embodiment may be used as a ground electrode or even a separate ground electrode may be provided.

As has been explained in the foregoing, a water level detecting means is provided in the fuel filter according to the present invention, wherein an alarm condition is indicated automatically when the water level in the casing of the fuel filter reaches a predetermined level indicating the necessity of removing the accumulated water in the fuel filter. Therefore inadvertent mistreatment or nonremoval of excess water in the fuel filter, which may cause deterioration of the filtering function and decrease the engine output characteristics due to introduction of a large amount of water into the engine, can be avoided.

By the provision of a cylindrical filter and a frusto-conical shaped filter as in the case of the first embodiment, the water separating function is increased. By providing a unit type cartridge being a combination of the casing, the filter element, and the connector, as in the case of the second embodiment, the handling and maintenance of the filter element is simplified.

By providing the water level detecting electrode in the connector for removing the water, the assembling and positioning becomes further simplified.

What is claimed is:

1. A fuel filter and water level detecting means comprising, in combination, a bracket having a fuel inlet and a fuel outlet, a filter casing mounted below said bracket, and a filter element arranged in said casing for filtering fuel introduced in the filter through said fuel inlet, wherein the improvement comprises a connector plug at a bottom portion of said filter casing, said plug including an electrode formed integrally therewith for water level detection, said electrode protruding to a predetermined level in the casing and being manually removable from the casing for water draining, a water level detecting circuit responsive to said electrode for detecting the level of water accumulated in the lower portion of the casing, said electrode developing an electric signal as a function of variation of conductance between the electrode and the casing, the detecting circuit having a delay response function to the input electric signal, and an alarm means responsive to an output signal of said water level detecting circuit for providing an alarm condition.

2. The fuel filter and water level detecting means as claimed in claim 1, wherein said filter element comprises a cylindrical filter element, a hollow column is provided at a central portion of said casing and the filter element is held concentrically by the hollow column, the fuel introduced from said fuel inlet being guided below the lower portion of the casing through a central passage of said hollow column and passed through the filter element from an outer surface of said element to an interior of said element and then passed out the fuel outlet.

3. The fuel filter and water level detecting means as claimed in claim 1, wherein the filter element includes a cylindrical filter portion and a frusto-conical shaped filter portion, a central portion of said casing having a hollow column, said cylindrical filter portion and said frusto-conical shaped filter portion are arranged vertically in succession and held concentrically by said hollow column, fuel introduced from said fuel inlet is guided below the lower portion of the casing through the central passage of said hollow column, said fuel first passing upwardly through said frusto-conical shaped filter portion and then inwardly through the cylindrical filter portion and then out the fuel outlet.

4. The fuel filter provided with a water level detecting means as claimed in claim 1, wherein the filter element is housed integrally in said casing to form a cartridge freely detachable from the bracket.

5. The fuel filter and water level detecting means as claimed in claim 1, wherein the casing is made of metal and acts as a counter electrode coacting with the water level detecting electrode.

6. The fuel filter and water level detecting means as claimed in claim 1, wherein the water level detecting electrode is formed integrally with said connector.

7. The fuel filter and water level detecting means as claimed in claim 1, wherein the delay response function of the water level detecting circuit is developed substantially by a capacitor.

* * * * *

UNITED STATES PATENT OFFICE
CERTIFICATE OF CORRECTION

PATENT NO. : 4,276,161
DATED : June 30, 1981
INVENTOR(S) : Katsuhiko MATSUI; Yukio KASHIWABA; and Yoshioki KISHIMOTO It is certified that error appears in the above-identified patent and that said Letters Patent are hereby corrected as shown below:

Cover page, item [73], add the following assignee:

--and Kabushiki Kaisha Tsuchiya Seisaku Sho, Yokohama, Japan--

Signed and Sealed this

Eighth Day of March 1983

[SEAL]

Attest:

GERALD J. MOSSINGHOFF

Attesting Officer     Commissioner of Patents and Trademarks